United States Patent [19]
Brindel et al.

[11] Patent Number: 5,905,825
[45] Date of Patent: May 18, 1999

[54] OPTICAL TRANSMISSION METHOD AND SYSTEM USING SOLITONS

[75] Inventors: Patrick Brindel, Longpont sur Orge; Elisabeth Brun, Paris, both of France

[73] Assignee: Alcatel Submarine Networks, Clichy, France

[21] Appl. No.: 08/818,551

[22] Filed: Mar. 14, 1997

[30] Foreign Application Priority Data

Mar. 18, 1996 [FR] France .................................. 96 03338

[51] Int. Cl.$^6$ ...................................................... G02B 6/28
[52] U.S. Cl. ............................ 385/24; 359/161; 359/173
[58] Field of Search .................................. 385/15, 24, 39, 385/122–124; 359/154, 161, 173, 179, 188, 195

[56] References Cited

U.S. PATENT DOCUMENTS

| | | | |
|---|---|---|---|
| 5,035,481 | 7/1991 | Mollenauer | 385/123 X |
| 5,504,829 | 4/1996 | Evans et al. | 385/123 |
| 5,764,841 | 6/1998 | Iwatsuki et al. | 385/123 |
| 5,767,998 | 6/1998 | Hasegawa et al. | 359/161 |
| 5,801,862 | 9/1998 | Desurvire et al. | 359/161 X |

OTHER PUBLICATIONS

Malomed,"Ideal amplification of an ultrashort soliton in a disperison–decreasing fiber", *Optics Letters,* vol. 19, No. 5, Mar. 1994, Washington, US, pp. 341–343.

Richardson et al, "High quality soliton loss–compensation in 38Km dispersion–decreasing fibre", *Electronics Letters,* vol. 31, No. 19, 14 Sep. 1995, Stevenage GB, pp. 1681–1682.

Hasegawa et al, "Reduction of collision–induced time jitters in dispersion–managed soliton transmission systems", *Optics Letters,* vol. 21, No. 1, Jan. 1996, Washington, US pp. 39–41.

*Primary Examiner*—John D. Lee
*Attorney, Agent, or Firm*—Sughrue, Mion, Zinn, Macpeak & Seas, PLLC

[57] ABSTRACT

In an optical transmission method solitons are transmitted through a succession of fibers in which their intensity progressively decreases. To limit distortion of the solitons, this decrease in their intensity is accompanied by a decrease in the chromatic dispersion of the fibers. In accordance with the invention, the succession of fibers includes at least a first fiber featuring continuously longitudinally decreasing chromatic dispersion. Subsequent fibers feature respective longitudinally constant chromatic dispersions forming a longitudinally decreasing sequence. Applications include telecommunications.

3 Claims, 1 Drawing Sheet

OPTICAL TRANSMISSION METHOD AND SYSTEM USING SOLITONS

BACKGROUND OF THE INVENTION

1. Field of the invention

The present invention concerns optical transmission and more specifically transmission of information by means of light pulses conveying the information and guided by optical fibers.

2. Description of the prior art

Optical fibers are subject to group velocity dispersion, also known as chromatic dispersion and referred to hereinafter for simplicity as "dispersion". This dispersion varies the speed of the spectral components of the pulse according to their optical frequency, which causes deformation of the pulse, to be more precise deformation of the temporal profile of the amplitude of the electromagnetic field of the pulse. Non-linearity in such fibers, also known as the Kerr effect, varies the relative phases of these components. Mutual compensation of this effect and of the dispersion can then occur in respect of the amplitude profile of the field of a pulse. For this to occur the pulse must have an amplitude profile shape, a phase distribution and an intensity that are suitable and dependent on the fiber, the pulse then constituting what is known as a fundamental soliton. A soliton of this kind would propagate indefinitely without deformation if this intensity were to be perfectly realized and maintained.

Unfortunately, optical fibers are also subject to losses that progressively decrease this intensity and at present it would not seem practicable to compensate such losses by continuous amplification that would make it possible to maintain a constant pulse intensity. This is why periodic amplification is applied by means of fiber amplifiers doped with erbium, for example, incorporated at regular intervals into a fiber optic line. The succession of fibers between two amplifiers is referred to hereinafter as a segment. This periodic amplification causes the intensity of the pulses to vary alternately between two extreme values at the respective ends of each segment. This intensity can be equal to that of the fundamental soliton only transiently, and distortion occurs. The main drawback of such distortion is that it leads to dispersion of some of the energy and widening of the pulse as it propagates through the segment. This can then penalize transmission.

Various arrangements have been proposed for at least limiting such distortion in the case of periodic amplification in this manner. In a first such arrangement, two conditions must be met. The first condition is that the distance between amplifiers remains less than the fundamental soliton period Zc defined at the end of this description. The second condition is that a mean intensity of the pulses is rendered equal over the segment to the intensity of the fundamental soliton. The pulse is then called an "average soliton". Its intensity varies between an initial value greater than that of the fundamental soliton at the input of each segment and a final value less than that of the fundamental soliton at the output of the segment. The use of an average soliton compensates for initial distortion near the input of the segment, and final distortion near the output of the segment. The propagation of an average soliton is described in the article: "Soliton Propagation in long fibers with Periodically Compensated Loss", L. F. Mollenauer, J. P. Gordon and M. N. Islam, IEEE Journal of Quantum Electronics, Vol. QE22, No 1, January 1986.

However, if the distance between amplifiers increases to the point where it becomes close to the soliton period, the distortion of the average soliton is accentuated. This is why a second arrangement has been proposed to limit distortion of the pulses in the case of periodic amplification. In this second prior art proposal the dispersion at each point along the length of each fiber is made approximately equal to an optimal dispersion matched to the intensity of the pulse at that point and, to be more precise, such that the pulse can continue to constitute a fundamental soliton of a fiber having this optimal dispersion. Given a substantially exponential decrease in this intensity along the segment, the optimal dispersion also decreases in a substantially exponential manner.

The second prior art proposal is to constitute the segments of a transmission system using variable dispersion fibers in which the dispersion at all points can be substantially equal to the optimal dispersion. On this aspect see the article in OPTICS LETTERS, Vol. 12, No. 1, January 1987, "Compensation of soliton broadening in nonlinear optical fibers with loss", Kazuhito Tajima, pages 54–56. Continuous longitudinal variation of the dispersion can be obtained by means of a corresponding variation in the diameter of the core of the fiber, this diameter variation in turn resulting from a temporal variation in the drawing parameters during the drawing operation that forms the fiber from a preform of much greater diameter. However, a fiber of this kind with a continuous variation of its dispersion has the drawback of a very much greater manufacturing cost per kilometer than ordinary fibers having longitudinally constant dispersion.

This is why it has also been proposed to constitute each segment of a line by a succession of fibers of constant dispersion disposed in decreasing dispersion order and choosing the dispersions so that they follow closely the decrease of the optimal dispersion. This solution is discussed in an article in OPTICS LETTERS, Vol. 19, No 3, Feb. 1, 1994, "Average soliton propagation in periodically amplified systems with stepwise dispersion-profiled fiber", W. Forysiak, F. M. Knox and N. J. Doran. It has the disadvantage of unwanted residual distortion of the pulses.

An aim of the present invention is to limit both the cost of a fiber optic line and the distortion of a pulse as it propagates in the line. Another aim of the present invention is to increase the information bit rate, the transmission distance spanned by a line of this kind and/or the spacing between the amplifiers of a line of this kind.

SUMMARY OF THE INVENTION

Accordingly, the present invention consists in an optical transmission method using solitons in which solitons are transmitted through a succession of fibers in which their intensity progressively decreases. In accordance with the present invention, the second of the prior art proposals previously mentioned for limiting distortion of the solitons is chosen. However, the disadvantages of the second prior art proposal are significantly reduced by including in the succession of fibers at least a first fiber featuring continuous longitudinal decrease of its dispersion and subsequent fibers featuring respective longitudinally constant dispersions forming a decreasing sequence.

With the aid of the accompanying diagrammatic drawings, there follows an explanation of how this invention may be put into effect. If the same component is shown in more than one figure, it is always designated by the same reference number and/or letter. If two components are designated by the same letter followed by different digits, the two components are of the same kind and have similar functions.

DETAILED DESCRIPTION OF THE PREFERRED EMBODIMENT

Figure 1:
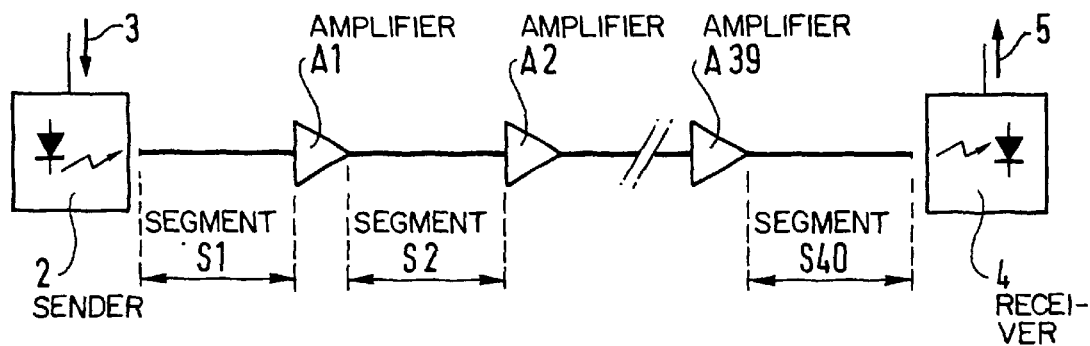
FIG. 1 shows a system in accordance with the present invention.
Figure 2:
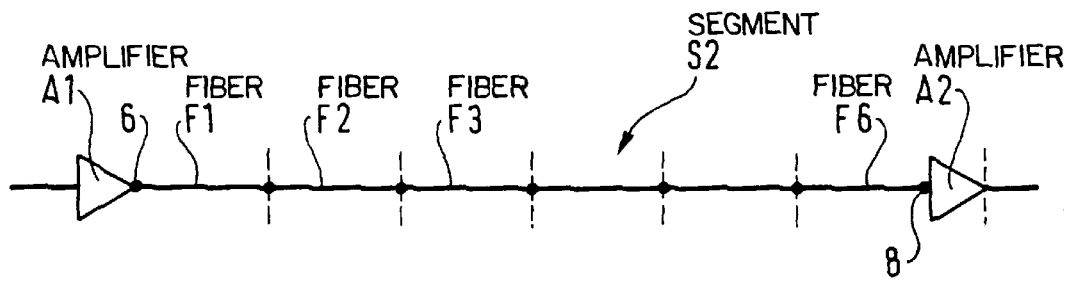
FIG. 2 shows a segment of the FIG. 1 system.
Figure 3:
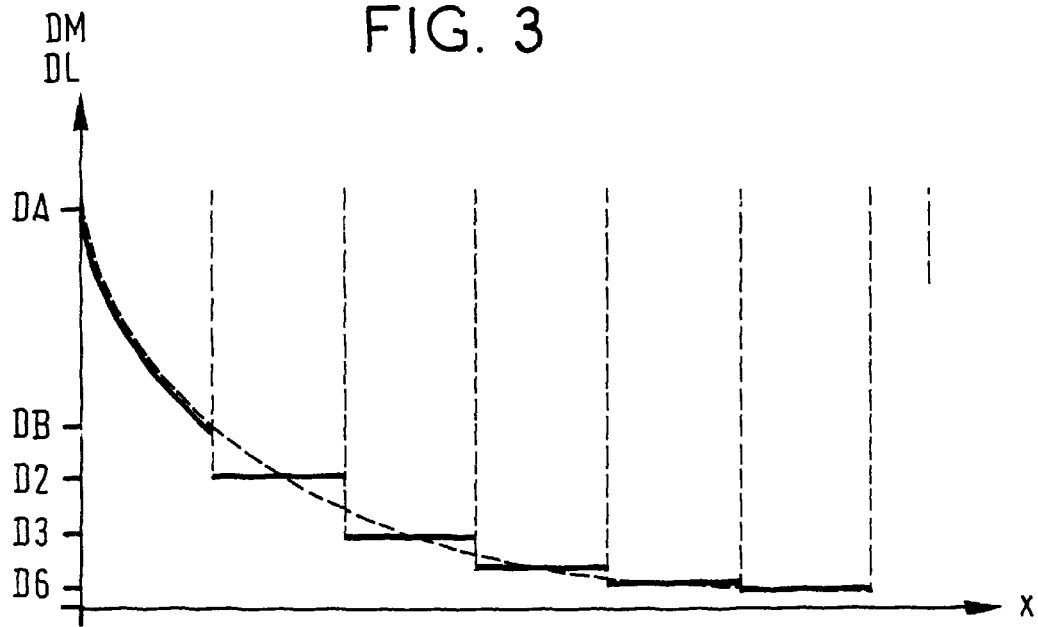
FIG. 3 comprises two diagrams, one in dashed line showing the longitudinal variation of the optimal dispersion in the segment from FIG. 2 and the other in full line showing the longitudinal variation of the effective local dispersion in this segment, the dispersion being plotted on the ordinate axis, the distance from an input of the segment being plotted along the abscissa axis.

As shown in the figures, a system in accordance with the present invention includes at least the following components that are known in themselves:

at least one segment S2 including a succession of fibers F1 . . . F6 to guide light of this system from an input 6 to an output 8 of this segment. An abscissa x is defined at each point of this segment from an origin at this input. Said fibers are subject to losses, the Kerr effect and group velocity dispersion for the light of the system such that this segment has at each abscissa a respective loss coefficient a, non-linearity coefficient and local dispersion DL. This local dispersion is typically a stepped dispersion and varies with the abscissa in the manner shown in FIG. 3. The loss and non-linearity coefficients are typically virtually constant. However, the non-linearity coefficient may vary according to the core diameter of the fibers used.

Components 2 . . . A1 on the input side of said segment for injecting into its input 6 at least one pulse constituted of the light of the system. This pulse has an initial shape and an initial intensity matched to the values of said non-linearity coefficient and said local dispersion so as to constitute approximately a fundamental soliton subject to only limited distortion as it propagates in this segment. Its intensity decreases progressively in accordance with an intensity variation law defined at least in part by said loss coefficient. An optimal dispersion is defined at each abscissa by this intensity variation law, allowing for said non-linearity coefficient. It is such that said fundamental soliton would not be subject to said distortion if the local dispersion at each abscissa remained equal to the optimal dispersion. The loss coefficient a typically being constant, the variation law for the intensity I of the pulse as a function of the abscissa x is of the type $$I(x)=I(o)e^{-ax}$$

where I(o) is the intensity at the input of the segment. The non-linearity coefficient being also typically constant, or varying only slightly, the optimal dispersion DM varies at least approximately in accordance with the law $$DM(x)=DM(o)e^{-ax}$$

If the dispersion departs from the optimal dispersion, the distortion is directly proportional to the difference. It is therefore beneficial for the local dispersion to decrease globally with the abscissa in such a manner as to limit the dispersion error at each abscissa (i.e. the difference between this local dispersion and the optimal dispersion).

Components on the output side of said segment to receive and use said pulse at the output from said segment.

In accordance with the present invention, the succession of fibers of said segment includes, from its input to its output, firstly at least one variable dispersion fiber F1 in which the local dispersion DL decreases continuously as the abscissa increases, from an initial value DA to a final DB. It then includes a succession of several constant dispersion fibers F2 . . . F6 in each of which the local dispersion DL is constant and constitutes a dispersion of that fiber. The dispersions of the fibers of this succession from a decreasing series D2 . . . D6.

The present invention effectively limits the distortion of the pulses because it utilizes a variable dispersion fiber where typical dispersion errors (2.8 ps/nm.km in the case of a 180 km spacing between amplifiers) would cause significant distortion. A variable dispersion fiber of this kind eliminates the distortion error almost totally over its entire length. At the same time, the present invention limits the cost of manufacture of the segment since the particularly costly variable dispersion fiber is used in only a small initial fraction of the length of the segment. This initial fraction typically has a length between about 1 km and about 10 km for a segment of about 60 km to about 180 km. Typical dispersion errors (e.g. 1 ps/nm.km) can be tolerated over the remaining fraction of the length of the segment, however. Given the dispersions of the fibers available for use on a site, the dispersion in this fraction must be adjusted not only by the selection and the ordering of the succession of fibers but also by choosing the lengths of the fibers.

The lengths must be chosen so that the ratio $L_i/Z_o$ is greater than 1, $Z_o$ being the soliton period and $L_i$ being the length of the fiber. It is known that $$Z_o=(\pi/2).Z_c$$

where $Z_c$ is the characteristic length of the soliton and has the value $$Z_c=0.322.(2\pi c/\lambda^2).dt^2/D_i$$

where $\lambda$=wavelength of light used, c=speed of light, dt=mid-height width of soliton pulse, $D_i$=chromatic dispersion of fiber.

As shown, a transmission system of the present invention typically includes the following components known in themselves:

A sender 2 adapted to receive information 3 to be transmitted and to send in response pulses constituted of the light of the system. These pulses are adapted to constitute approximate fundamental solitons along the segment. They are identical and convey the information to be transmitted.

A line, typically a very long line, possibly having a length of as much as several thousand kilometers. This line includes an alternating succession of said segments S1 . . . S40 and amplifiers A1 . . . A39 in series. A first segment S1 of this succession receives these pulses from the sender 2. These pulses approximately constitute fundamental solitons along this first segment. Each amplifier A1 receives these pulses with an intensity decreased by the losses of a preceding segment (S1) and transmits them to a subsequent segment with an increased intensity such that these pulses constitute approximately fundamental solitons in this subsequent segment.

A receiver 4 for receiving the pulses from the output of the last segment S40 of said line. It supplies in response transmitted information which, if the system is operating correctly, corresponds to said information to be transmitted.

There is claimed:

1. An optical transmission method for transmitting solitons through a succession of optical fibers with minimal distortion of said solitons, wherein the intensity of said solitons is controlled to progressively decrease as the chromatic dispersion of said fibers decreases, and, said succession of fibers includes;

at least a first fiber featuring a continuously longitudinally decreasing chromatic dispersion and a plurality of subsequent fibers respectively featuring longitudinally constant chromatic dispersions forming a longitudinally decreasing sequence.

2. An optical transmission system using solitons, including:

at least one segment including a succession of fibers for guiding light from an input to an output of said segment, an abscissa being defined at each point of said segment from an origin at said input, said fibers having light losses, Kerr effects and group velocity dispersions such that said segment has for each abscissa a respective loss coefficient, non-linearity coefficient and local dispersion, said local dispersion being a stepped dispersion and varying with said abscissa, components on an input side of said segment for injecting into said input of said segment at least one pulse constituted of said light and having an initial shape and an initial intensity matched to said nonlinearity coefficient and said local dispersion so that said pulse constitutes approximately a soliton subject to only limited distortion as it propagates in said segment, the intensity of said pulse decreasing progressively in accordance with an intensity variation law defined at least in part by said loss coefficient, an optimal dispersion being defined at each abscissa by said intensity variation law, allowing for said non-linearity coefficient and such that said soliton would be subject to said distortion to only a minimal degree if said local dispersion at each abscissa were to remain equal to said optimal dispersion, said local dispersion decreasing with said abscissa in such manner as to limit the values of a dispersion error at each abscissa consisting of the difference between said local dispersion and said optimal dispersion, and components on the output side of said segment for receiving and using said pulse at said output from said segment, in which system said succession of fibers of said segment includes, from said input to said output:

firstly at least one variable dispersion fiber in which said local dispersion decreases continuously as said abscissa increases, and then a succession of constant dispersion fibers in each of which said local dispersion is constant and constitutes a dispersion of said fiber, said dispersions of said fibers of said succession forming a decreasing sequence.

3. A system as claimed in claim 2 including:

a sender for receiving information to be transmitted and for sending in response pulses constituted of said light, adapted to constitute identical fundamental solitons conveying said information to be transmitted, a line including an alternating succession of said segments and amplifiers in series, a first segment of said succession receiving said pulses from said sender and being such that said pulses substantially constitute fundamental solitons in said first segment, each amplifier receiving said pulses with an intensity reduced by the losses of a preceding segment and transmitting them to a subsequent segment with an increased intensity such that said pulses substantially constitute fundamental solitons in said subsequent segment, and a receiver for receiving said pulses at the output of a final segment of said line and supplying in response thereto transmitted information corresponding to said information to be transmitted.

* * * * *